(12) United States Patent
Yonekura et al.

(10) Patent No.: US 8,902,391 B2
(45) Date of Patent: Dec. 2, 2014

(54) LIQUID CRYSTAL DISPLAY DEVICE AND METHOD OF MANUFACTURING LIQUID CRYSTAL DISPLAY DEVICE

(75) Inventors: Toshimasa Yonekura, Kanazawa (JP); Masanobu Nonaka, Nonoichi (JP); Kazuhiro Takahashi, Kanazawa (JP); Masato Kesho, Kanazawa (JP)

(73) Assignee: Japan Display Inc., Tokyo (JP)

( * ) Notice: Subject to any disclaimer, the term of this patent is extended or adjusted under 35 U.S.C. 154(b) by 191 days.

(21) Appl. No.: 13/589,665

(22) Filed: Aug. 20, 2012

(65) Prior Publication Data

US 2013/0050604 A1 Feb. 28, 2013

(30) Foreign Application Priority Data

Aug. 31, 2011 (JP) ................................. 2011-189029

(51) Int. Cl.
*G02F 1/1343* (2006.01)
*G02F 1/1368* (2006.01)

(52) U.S. Cl.
CPC ............ *G02F 1/1343* (2013.01); *G02F 1/1368* (2013.01)
USPC .......................................................... 349/141

(58) Field of Classification Search
USPC .......................................................... 349/141
See application file for complete search history.

(56) References Cited

U.S. PATENT DOCUMENTS

| | | | | |
|---|---|---|---|---|
| 6,069,678 | A * | 5/2000 | Sakamoto et al. | ............ 349/141 |
| 6,266,116 | B1 | 7/2001 | Ohta et al. | |
| 6,542,212 | B2 * | 4/2003 | Yoshida et al. | ............... 349/141 |
| 7,609,353 | B2 * | 10/2009 | Kim et al. | ...................... 349/144 |
| 2001/0010575 | A1 | 8/2001 | Yoshida et al. | |
| 2004/0165136 | A1 | 8/2004 | Sugiyama et al. | |
| 2005/0206824 | A1 | 9/2005 | Son et al. | |
| 2005/0219453 | A1 | 10/2005 | Kubo et al. | |
| 2007/0115234 | A1 | 5/2007 | Kim et al. | |
| 2008/0062358 | A1 | 3/2008 | Lee et al. | |
| 2008/0180590 | A1 | 7/2008 | Lee et al. | |
| 2008/0180623 | A1 | 7/2008 | Lee et al. | |
| 2008/0186439 | A1 | 8/2008 | Kwon et al. | |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |

(Continued)

OTHER PUBLICATIONS

Japanese Office Action issued Apr. 8, 2014, in Japan Patent Application No. 2011-189029 (with English translation).

*Primary Examiner* — James Dudek
(74) *Attorney, Agent, or Firm* — Oblon, Spivak, McClelland, Maier & Neustadt, L.L.P.

(57) ABSTRACT

According to one embodiment, a device includes a first substrate including a pixel electrode including a contact portion, main pixel electrodes extending from the contact portion in a second direction, and a connection portion which electrically connects the main pixel electrodes, and a switching element including a drain electrode disposed at a middle position in the first direction of the pixel electrode and formed integral with the pixel electrode, a second substrate including main common electrodes extending substantially in parallel to the main pixel electrodes, on both sides of the main pixel electrodes, and sub-common electrodes which extend between the main common electrodes and are located between the pixel electrodes arranged in the second direction, and a liquid crystal layer.

18 Claims, 9 Drawing Sheets

(56) References Cited

FOREIGN PATENT DOCUMENTS

| JP | 9-230380 | 9/1997 |
| JP | 10-26765 | 1/1998 |
| JP | 10-90708 | 4/1998 |
| JP | 11-295764 | 10/1999 |
| JP | 2005-3802 | 1/2005 |
| JP | 3644653 | 2/2005 |
| JP | 2005-242307 | 9/2005 |
| JP | 2009-192822 | 8/2009 |
| WO | WO 97/10530 | 3/1997 |

\* cited by examiner

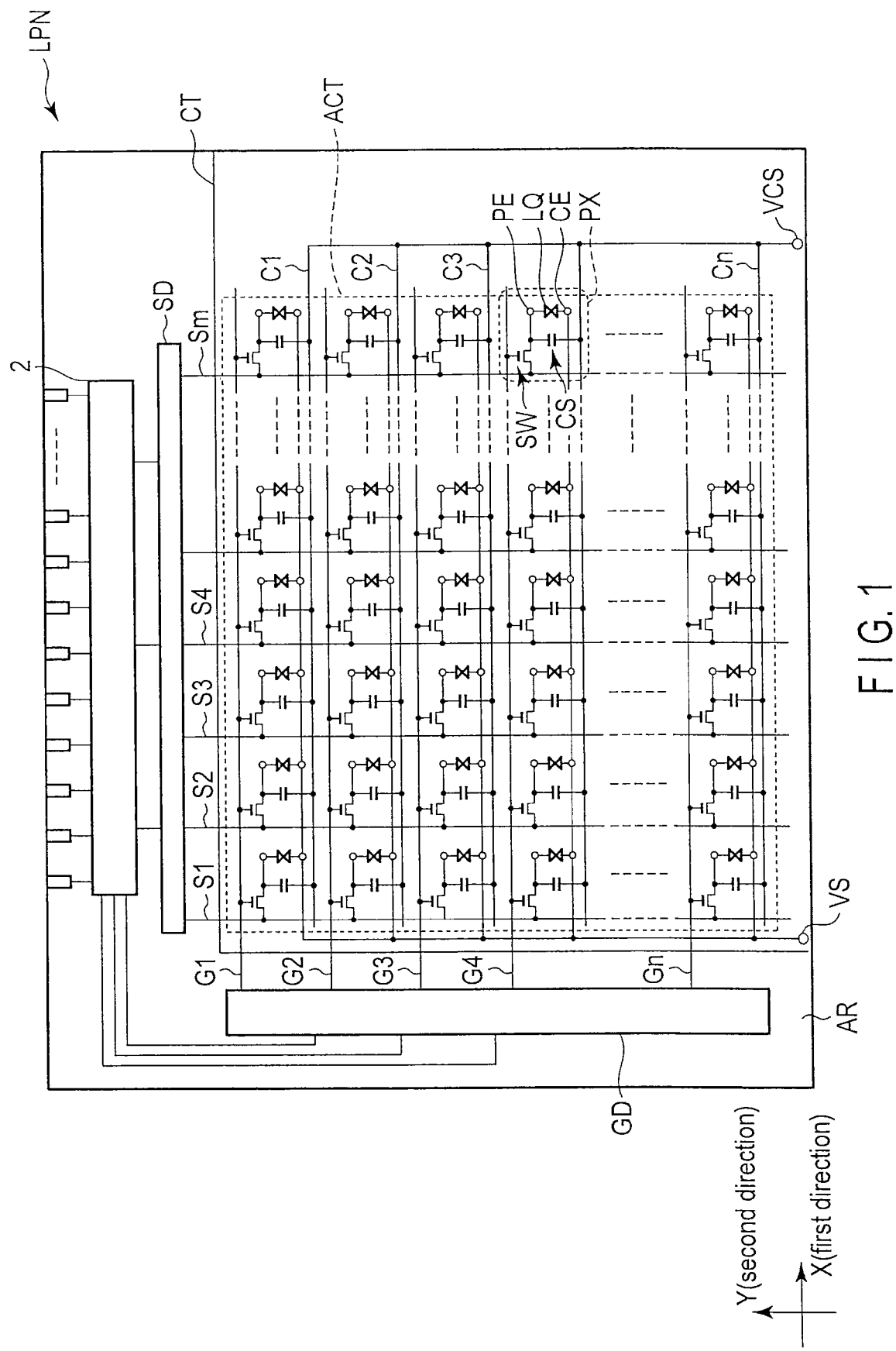
F I G. 1

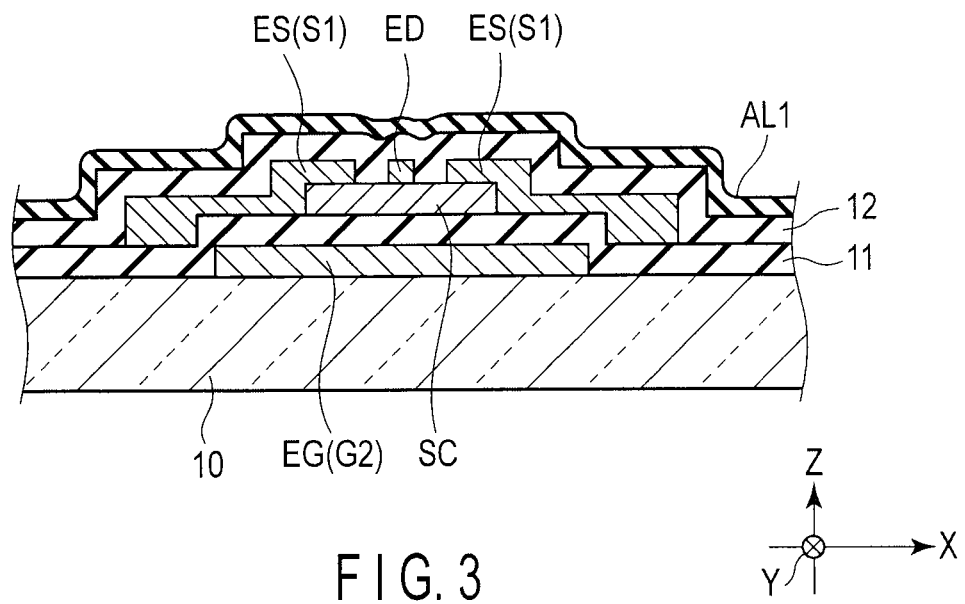
F I G. 3

LIQUID CRYSTAL DISPLAY DEVICE AND METHOD OF MANUFACTURING LIQUID CRYSTAL DISPLAY DEVICE

CROSS-REFERENCE TO RELATED APPLICATIONS

This application is based upon and claims the benefit of priority from Japanese Patent Application No. 2011-189029, filed Aug. 31, 2011, the entire contents of which are incorporated herein by reference.

FIELD

Embodiments described herein relate generally to a liquid crystal display device and a method of manufacturing the liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 1 is a view which schematically illustrates a structure and an equivalent circuit of a liquid crystal display device according to an embodiment.

FIG. 3 is a schematic cross-sectional view, taken along line III-III in FIG. 2, showing a cross-sectional structure of the liquid crystal display panel shown in FIG. 2.

DETAILED DESCRIPTION

Figure 2:
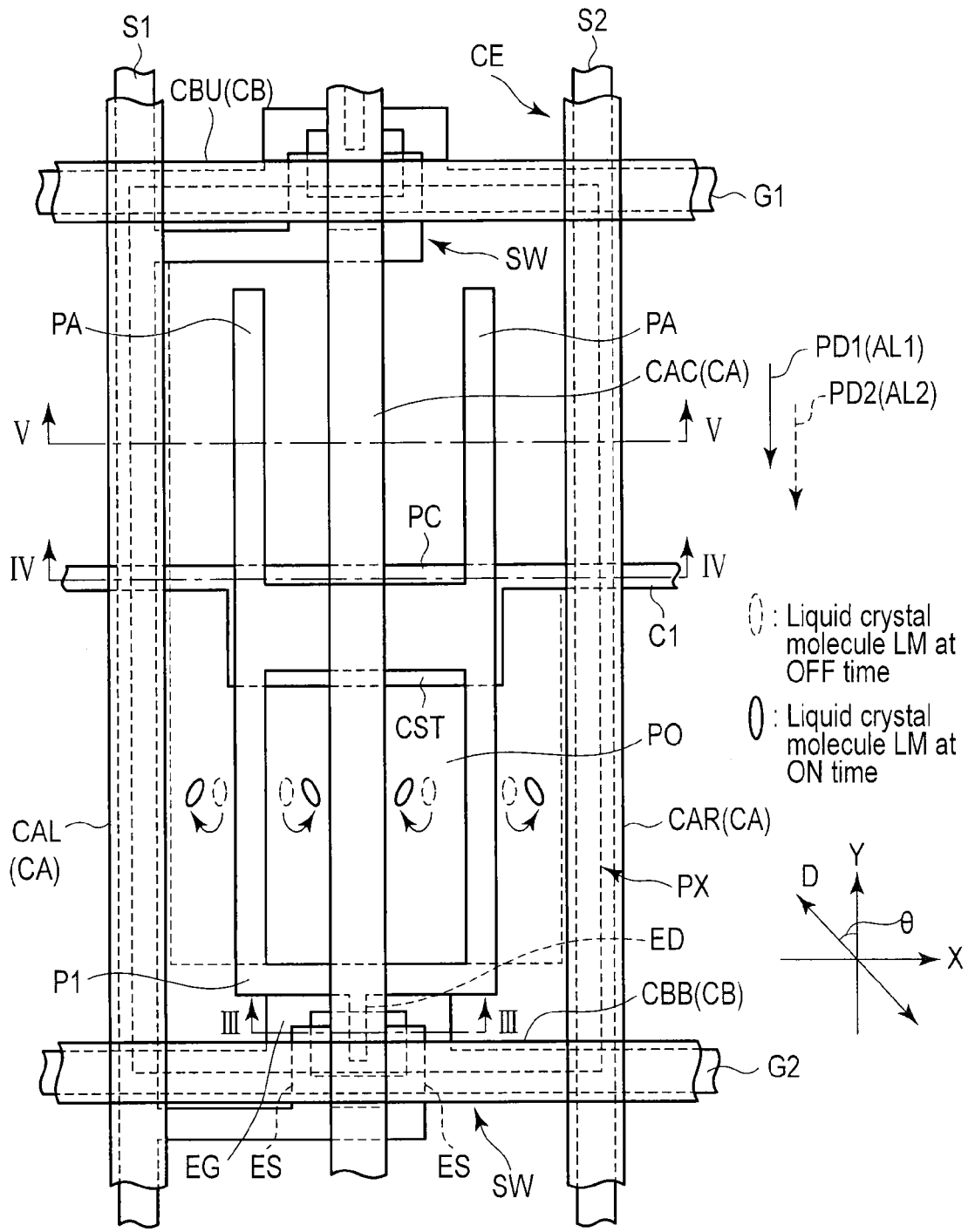
FIG. 2 is a plan view which schematically shows a structure example of a pixel at a time when a liquid crystal display panel shown in FIG. 1 is viewed from a counter-substrate side.

In general, according to one embodiment, a liquid crystal display device comprises a first substrate including a first insulative substrate, a first wiring line extending in a first direction on a side of the first insulative substrate, a second wiring line disposed spaced apart from the first wiring line, an interlayer insulation film covering the first wiring line and the second wiring line, third wiring lines extending in a second direction crossing the first direction on the interlayer insulation film, and a first electrode including, on the interlayer insulation film, a capacitance portion opposed to the second wiring line, and main pixel electrodes extending from the capacitance portion in the second direction, the first electrode being spaced apart from the third wiring lines; a second substrate including a second insulative substrate, and second electrodes extending, on a side of the second insulative substrate which is opposed to the first substrate, in a direction which is substantially parallel to a direction of extension of the first electrode, on both sides of the first electrode; and a liquid crystal layer including liquid crystal molecules held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C correspond to first wiring lines extending substantially linearly, for example, in a first direction X. The gate lines G and storage capacitance lines C are alternately arranged in parallel along a second direction Y crossing the first direction X. In this example, the first direction X and the second direction Y are perpendicular to each other. The source lines S cross the gate lines G and storage capacitance lines C. The lines S correspond to second wiring lines extending substantially linearly along the second direction Y. It is not always necessary that each of the gate lines G, storage capacitance lines C and source lines S extend linearly, and a part thereof may be bent. In addition, there may be a case that the gate lines G and storage capacitance lines C correspond to the second wiring lines extending substantially linearly along the second direction Y, and the source lines S correspond to the first wiring lines extending substantially linearly along the first direction X.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, amorphous silicon, but it may be formed of polysilicon.

The pixel electrodes PE are disposed in the respective pixels PX, and are electrically connected to the switching elements SW. The common electrode CE is disposed common to the pixel electrodes PE of plural pixels PX via the liquid crystal layer LQ.

The pixel electrode PE is formed of an opaque electrically conductive material, or an electrically conductive material with a light-blocking property, or reflectivity. For example, the pixel electrode PE is formed of a metallic material selected from among aluminum (Al), titanium (Ti), silver (Ag), molybdenum (Mo), tungsten (W), copper (Cu) and chromium (Cr), or an alloy (e.g. AlNd) including one of these materials.

The common electrode CE is formed of a light-transmissive, electrically conductive material such as indium tin oxide (ITO) or indium zinc oxide (IZO). However, the common electrode CE may be formed of other metallic material such as aluminum.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

FIG. 2 is a plan view which schematically shows a structure example of one pixel PX at a time when the liquid crystal display panel LPN shown in FIG. 1 is viewed from the counter-substrate side. FIG. 2 is a plan view in an X-Y plane.

The pixel PX shown in FIG. 2 has a rectangular shape having a less length in the first direction X than in the second direction Y, as indicated by a broken line. In this embodiment, the width of the pixel PX in the first direction X is about 60 μm, and the width of the pixel PX in the second direction Y is about 180 μm. A gate line G1 and a gate line G2 extend in the first direction X. A storage capacitance line C1 is disposed between the gate line G1 and the gate line G2 which neighbor each other, and extends in the first direction X. A source line S1 and a source line S2 extend in the second direction Y. A pixel electrode PE is disposed between the source line S1 and source line S2 which neighbor each other. In addition, the pixel electrode PE is disposed between the gate line G1 and gate line G2.

In the example illustrated, in the pixel PX, the source line S1 is disposed at a left side end portion, and the source line S2 is disposed at a right side end portion. Strictly speaking, the source line S1 is disposed to extend over a boundary between the pixel PX and a pixel neighboring on the left side, and the source line S2 is disposed to extend over a boundary between the pixel PX and a pixel neighboring on the right side. In addition, in the pixel PX, the gate line G1 is disposed at an upper side end portion, and the gate line G2 is disposed at a lower side end portion. Strictly speaking, the gate line G1 is disposed to extend over a boundary between the pixel PX and a pixel neighboring on the upper side, and the gate line G2 is disposed to extend over a boundary between the pixel PX and a pixel neighboring on the lower side. The storage capacitance line C1 is disposed at a substantially central part of the pixel.

A switching element SW in the illustrated example is electrically connected to the gate line G2 and source line S1. The switching element SW is provided near an intersection between the gate line G2 and source line S1.

A gate electrode EG of the switching element SW is electrically connected to the gate line G2 (or formed integral with the gate line G2), a source electrode ES of the switching element SW is electrically connected to the source line S1 (or formed integral with the source line S1), and a drain electrode ED of the switching element SW is electrically connected to the pixel electrode PE (or formed integral with the pixel electrode PE).

The drain electrode ED of the switching element SW extends upward from the lower side end portion of the pixel PX in the second direction Y, at a middle position in the first direction X of the pixel electrode PE, and extends up to the pixel electrode PE. The drain electrode ED is electrically connected to a connection portion P1 (or formed integral with the connection portion P1) at a substantially middle position in the first direction X of the pixel electrode PE. The storage capacitance line C1 includes a projection portion CST which protrudes to the switching element SW side, at a substantially middle portion in the first direction X of the pixel PX.

FIG. 3 is a schematic cross-sectional view showing a cross-sectional structure of the array substrate AR, when the liquid crystal display panel LPN is cut along III-III in FIG. 2.

The gate electrode EG of the switching element SW is disposed on a first insulative substrate 10. The gate electrode EG is covered with a first interlayer insulation film 11. A semiconductor layer SC, which is formed of amorphous silicon, is disposed above the gate electrode EG via the first interlayer insulation film 11. The source electrode ES and drain electrode ED are disposed on the semiconductor layer SC. An end portion of the source electrode ES is branched into two source electrodes ES, which are disposed on both ends of the semiconductor layer SC in the first direction X. The drain electrode ED is disposed on the semiconductor layer SC between the two source electrodes ES in the first direction X. The source electrodes ES and drain electrode ED are covered with a second interlayer insulation film. The second interlayer insulation film is covered with a first alignment film AL1.

As shown in FIG. 2, the pixel electrode PE includes main pixel electrodes PA, a connection portion P1 and a capacitance portion PC. The connection portion P1 is disposed near the lower end portion of the pixel PX (near the switching element SW that is connected to the pixel electrode PE of the pixel PX), and is electrically connected to the drain electrode ED of the switching element SW (or formed integral with the drain electrode ED). The capacitance portion PC is located at a region overlapping the projection portion CST of the storage capacitance line C1, and is opposed to the projection portion CST, thereby forming the storage capacitance CS. The capacitance portion PC has a greater width than the main pixel electrode PA.

The main pixel electrodes PA linearly extend in the second direction Y from end portions in the first direction X of the capacitance portion PC. The main pixel electrodes PA are electrically connected to the connection portion P1 which extends in the first direction X in the vicinity of the lower side end portion of the pixel PX. Specifically, on the lower side of the capacitance portion PC of the pixel electrode PE, there is provided a substantially rectangular aperture PO which is surrounded by the main pixel electrodes PA, connection portion P1 and capacitance portion PC. The aperture PO is located at a substantially middle position between the source line S1 and source line S2, that is, at the center of the pixel PX in the first direction X.

The common electrode CE includes main common electrodes CA and sub-common electrodes CB. The main common electrodes CA linearly extend, in the X-Y plane, in the second direction Y which is substantially parallel to the main pixel electrodes PA, on both sides of the main pixel electrodes PA. Alternatively, the main common electrode CA is opposed to the source line S or aperture PO, and extends substantially in parallel to the main pixel electrode PA. The main common electrode CA is formed in a strip shape having a substantially uniform width in the first direction X.

In the example illustrated, three main common electrodes CA are arranged in parallel in the first direction X, and are located at left and right end portions and a central portion of the pixel PX, respectively. In the description below, in order to distinguish these main common electrodes CA, the main common electrode located on the left side in the Figure is referred to as "CAL", the main common electrode located on the right side in the Figure is referred to as "CAR", and the main common electrode located at the central portion in the Figure is referred to as "CAC". The main common electrode CAL is opposed to the source line S1, the main common electrode CAR is opposed to the source line S2, and the main common electrode CAC is opposed to the aperture PO of the pixel electrode PE. The main common electrode CAL, main common electrode CAR and main common electrode CAC are electrically connected to each other within the active area or outside the active area.

In the pixel PX, the main common electrode CAL is disposed at the left side end portion, and the main common electrode CAR is disposed at the right side end portion. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side. The main common electrode CAC is disposed at a substantially middle portion in the first direction X of the pixel PX.

The sub-common electrodes CB extend, in the X-Y plane, linearly in the first direction X between apertures PO of pixel electrodes PE which are arranged in the second direction Y. The sub-common electrodes CB extend substantially perpendicular to the main pixel electrodes PA. The sub-common electrode CB is formed in a strip shape having a substantially uniform width in the second direction Y.

In the example illustrated, the sub-common electrodes CB are disposed between pixel electrodes PE which are arranged in the second direction Y, and are disposed on the upper side and lower side of the pixel PX. In the description below, in order to distinguish these sub-common electrodes CB, the sub-common electrode located on the upper side in the Figure is referred to as "CBU", and the sub-common electrode located on the lower side is referred to as "CBB". The sub-common electrode CBU is opposed to the gate line G1, and the sub-common electrode CBB is opposed to the gate line G2. The sub-common electrode CBU and sub-common electrode CBB are electrically connected to each other within the active area or outside the active area. Specifically, the common electrode CE is formed in a grid shape in the active area.

In the pixel PX, the sub-common electrode CBU is disposed at the upper side end portion, and the sub-common electrode CBB is disposed at the lower side end portion. Strictly speaking, the sub-common electrode CBU is disposed to extend over a boundary between the pixel PX and a pixel neighboring on the upper side, and the sub-common electrode CBB is disposed to extend over a boundary between the pixel PX and a pixel neighboring on the lower side.

Paying attention to the positional relationship between the pixel electrode PE and the common electrode CE, the main pixel electrodes PA and main common electrodes CA are alternately arranged along the first direction X. The main pixel electrodes PA and main common electrodes CA are arranged substantially parallel to each other. In this case, in the X-Y plane, the main common electrode CAL, main common electrode CAR and main common electrode CAC do not overlap the main pixel electrode PA.

Specifically, one main pixel electrode PA is located between the main common electrode CAL and main common electrode CAC which neighbor each other, and between the main common electrode CAR and main common electrode CAC. The main pixel electrodes PA are surrounded by the main common electrodes CA and sub-common electrodes CB. In other words, the main common electrode CAL, main common electrode CAR and main common electrode CAC are located on both sides of positions immediately above the main pixel electrodes PA. Alternatively, the main pixel electrodes PA are located between the main common electrode CAL and main common electrode CAC, and between the main common electrode CAR and main common electrode CAC. Thus, the main common electrode CAL, main pixel electrode PA, main common electrode CAC, main pixel electrode PA and main common electrode CAR are arranged in the named order along the first direction X.

The intervals in the first direction X between the pixel electrodes PE and common electrodes CE are substantially equal. Specifically, the distance in the first direction X between the main common electrode CAL and main pixel electrode PA, the distance in the first direction X between the main common electrode CAC and main pixel electrode PA, the distance in the first direction X between the main common electrode CAR and main pixel electrode PA, are substantially equal.

Figure 4:
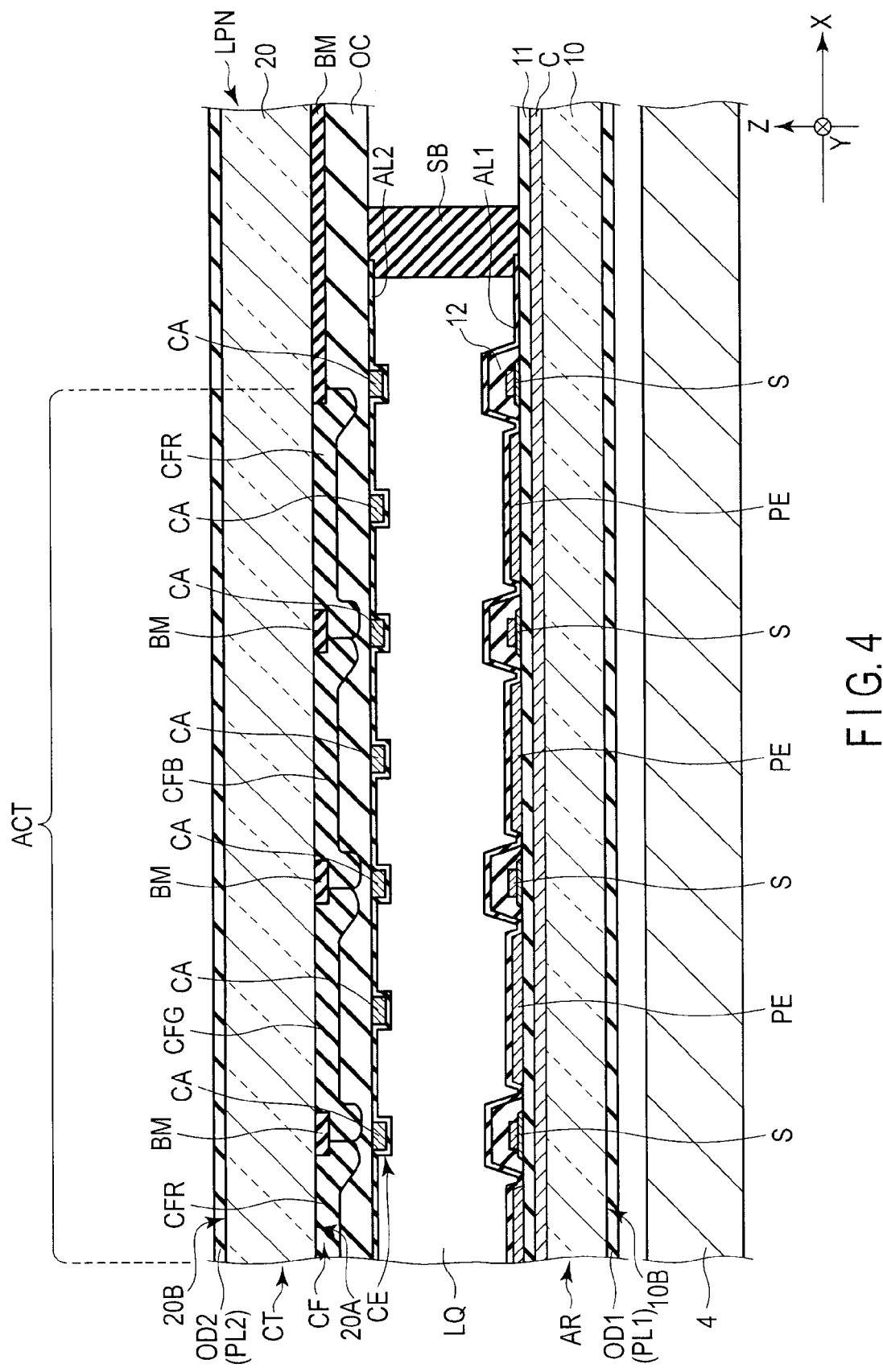
FIG. 4 is a schematic cross-sectional view, taken along line IV-IV in FIG. 2, showing a cross-sectional structure of the liquid crystal display panel shown in FIG. 2.

FIG. 4 is a schematic cross-sectional view, taken along line IV-IV in FIG. 2, showing a cross-sectional structure of the liquid crystal display panel LPN shown in FIG. 2. FIG. 4 shows only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. A storage capacitance line C is formed on the first insulative substrate 10, and is covered with a first interlayer insulation film 11. Source lines S are formed on the first interlayer insulation film 11, and are covered with a passivation film 12. Gate lines (not shown) are disposed in the same layer as the storage capacitance line C. Pixel electrodes PE are formed in the same layer as the source lines S. Specifically, the pixel electrodes PE are formed on the first interlayer insulation film 11. The pixel electrode PE is located inside the positions immediately above the neighboring source lines S.

A first alignment film AL1 is disposed on that surface of the array substrate AR, which is opposed to the counter-substrate CT, and the first alignment film AL1 extends over substantially the entirety of the active area ACT. The first alignment film AL1 covers the pixel electrodes PE, etc., and is also disposed over the first interlayer insulation film 11 and passivation film 12. The first alignment film AL1 is formed of a material which exhibits horizontal alignment properties.

In the meantime, the array substrate AR may also include a part of the common electrode CE.

The counter-substrate CT is formed by using a second insulative substrate 20 having light transmissivity. The counter-substrate CT includes a black matrix BM, a color filter CF, an overcoat layer OC, a common electrode CE, and a second alignment film AL2.

The black matrix BM partitions each pixel PX, and forms an aperture portion AP which is opposed to the pixel electrode PE. Specifically, the black matrix BM is disposed so as to be opposed to wiring portions, such as the source lines S, gate lines, storage capacitance lines C, and switching elements. In this example, only those portions of the black matrix BM, which extend in the second direction Y, are depicted, but the black matrix BM may also include portions which extend in the first direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter CFR, which is formed of a resin material that is colored in red, is disposed in association with a red pixel. A blue color filter CFB, which is formed of a resin material that is colored in blue, is disposed in association with a blue pixel. A green color filter CFG, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF.

The common electrode CE is formed on that side of the overcoat layer OC, which is opposed to the array substrate AR.

The second alignment film AL2 is disposed on that surface of the counter-substrate CT, which is opposed to the array substrate AR, and the second alignment film AL2 extends over substantially the entirety of the active area ACT. The second alignment film AL2 covers the common electrode CE and overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, and a second alignment treatment direction PD2, in which the second alignment film AL2 initially aligns the liquid crystal molecules, are parallel to each other, and are opposite to or identical to each other. For example, as shown in FIG. 2, the first alignment treatment direction PD1 and second alignment treatment direction PD2 are substantially parallel to the second direction Y, and are identical.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 µm, is created. The array substrate AR and counter-substrate CT are attached by a sealant SB on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ is composed of, for example, a liquid crystal material having a positive (positive-type) dielectric constant anisotropy.

A first optical element OD1 is attached by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis).

A second optical element OD2 is attached by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis).

The first polarization axis of the first polarizer PL1 and the second polarization axis of the second polarizer PL2 have an orthogonal positional relationship (crossed Nicols). In this case, one of the polarizers is disposed, for example, such that the polarization axis thereof is parallel or perpendicular to the initial alignment direction of liquid crystal molecules, that is, the first alignment treatment direction PD1 or second alignment treatment direction PD2. When the initial alignment direction is parallel to the second direction Y, the polarization axis of one of the polarizers is parallel to the second direction Y or parallel to the first direction X.

Figure 5:
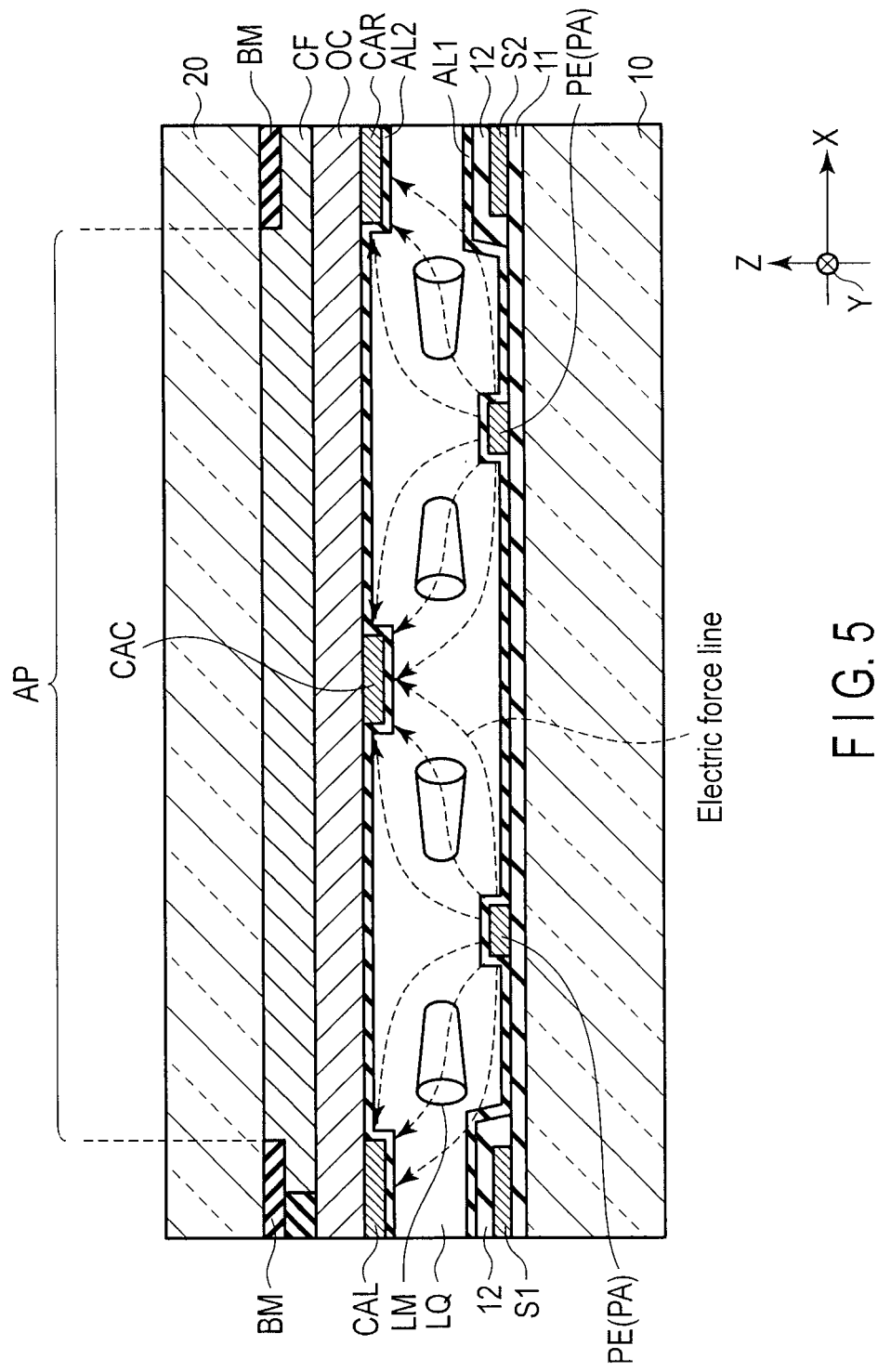
FIG. 5 is a schematic cross-sectional view, taken along line V-V in FIG. 2, showing a cross-sectional structure of the liquid crystal display panel shown in FIG. 2.

FIG. 5 is a schematic cross-sectional view, taken along line V-V in FIG. 2, showing a cross-sectional structure of the liquid crystal display panel LPN shown in FIG. 2. FIG. 5 shows only parts which are necessary for the description.

Next, the operation of the liquid crystal display panel LPN having the above-described structure is described with reference to FIG. 2 to FIG. 5.

Specifically, in a state in which no voltage is applied to the liquid crystal layer LQ, that is, in a state (OFF time) in which no potential difference (or electric field) is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 2. Specifically, the initial alignment direction of the liquid crystal molecule LM is parallel to the second direction Y (or 0° to the second direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment).

As the result of the alignment treatment of the first alignment film AL1 in the first alignment treatment direction PD1, the liquid crystal molecules LM in the vicinity of the first alignment film AL1 are initially aligned in the first alignment treatment direction PD1. As the result of the alignment treatment of the second alignment film AL2 in the second alignment treatment direction PD2, the liquid crystal molecules LM in the vicinity of the second alignment film AL2 are initially aligned in the second alignment treatment direction PD2. When the first alignment treatment direction PD1 and the second alignment treatment direction PD2 are parallel and identical to each other, the liquid crystal molecules LM are splay-aligned, as described above, and the alignment of the liquid crystal molecules LM in the vicinity of the first alignment film AL1 on the array substrate AR and the alignment of the liquid crystal molecules LM in the vicinity of the second alignment film AL2 on the counter-substrate CT become symmetric in the up-and-down direction with respect to the middle part of the liquid crystal layer LQ as the boundary. Thus, optical compensation can be made even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, varies depending on the alignment state of the liquid crystal molecules LM at a time when the light passes through the liquid crystal layer LQ. At the OFF time, the light, which has passed through the liquid crystal layer LQ, is absorbed by the second polarizer PL2 (black display).

On the other hand, in a state in which a voltage is applied to the liquid crystal layer LQ, that is, in a state (ON time) in which a potential difference (or electric field) is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is parallel to the X-Y plane, as indicated by solid lines in the Figure.

In the example shown in FIG. 2, the liquid crystal molecule LM in a region between the pixel electrode PE and main common electrode CAL rotates clockwise relative to the second direction Y, and is aligned in a lower left direction in the Figure. The liquid crystal molecule LM in a region between the pixel electrode PE and main common electrode CAR rotates counterclockwise relative to the second direction Y, and is aligned in a lower right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains are formed in one pixel PX.

At such ON time, part of backlight, which is incident on the liquid crystal display panel LPN from the backlight 4, passes through the first polarizer PL1, and enters the liquid crystal display panel LPN. The light entering the liquid crystal layer LQ varies the polarization state thereof. At the ON time, at least part of the light emerging from the liquid crystal layer LQ passes through the second polarizer PL2 (white display).

In the liquid crystal display device of the present embodiment, as described above, since the pixel electrode PE and source line S are disposed in the same layer, there is no need to provide a contact hole for electrically connecting the pixel electrode PE and the drain electrode ED of the switching element SW. Therefore, the aperture portion AP of the pixel can be made larger.

Next, a description is given of a method of manufacturing the above-described liquid crystal display device.

To begin with, a method of fabricating the array substrate AR is described. On a first transparent insulative substrate from which a plurality of array substrates AR are to be cut out, an electrically conductive layer is formed by using a metallic material selected from among aluminum (Al), titanium (Ti), silver (Ag), molybdenum (Mo), tungsten (W), copper (Cu) and chromium (Cr), or an alloy (e.g. AlNd) including one of these materials. A resist is coated on this electrically conductive layer. Thereafter, an electrode pattern is formed by exposure and development, and the electrically conductive layer is patterned by etching. Then, the resist is peeled, and gate lines G, storage capacitance lines C and other various wiring lines are formed.

Subsequently, after an insulation film, which becomes a first interlayer insulation film 11, is formed, an amorphous silicon film is formed. Thereafter, a resist is coated, exposed and developed to form a predetermined pattern, and the amorphous silicon film is patterned by etching. Thereby, a semiconductor layer SC is formed.

Next, an electrically conductive layer is formed by using a metallic material selected from among aluminum (Al), titanium (Ti), silver (Ag), molybdenum (Mo), tungsten (W), copper (Cu) and chromium (Cr), or an alloy (e.g. AlNd) including one of these materials. A resist is coated on this electrically conductive layer. Thereafter, a predetermined electrode pattern is formed by exposure and development, and this electrically conductive layer is patterned by etching. Thus, source lines S, pixel electrodes PE, drain electrodes ED of switching elements SW, and other various wiring lines are formed.

Subsequently, after an inorganic film, such as a nitride film, is formed, a resist is coated, exposed and developed to form an aperture pattern of the pixel PX, and this inorganic film is patterned by etching. Thereby, a passivation film 12 with a predetermined pattern is formed. In the meantime, the passivation film 12 is not limited to the inorganic film, and the passivation film 12 may be formed of an organic film of, e.g. HRC.

After the passivation film 12 is formed, an alignment film is coated on the active area ACT, and a predetermined alignment treatment is performed. Thus, a plurality of array substrates AR are formed.

Next, a method of forming the counter-substrate CT is described. On a second transparent insulative substrate from which a plurality of counter-substrates CT are to be cut out, colored exposure resists are repeatedly coated, exposed and developed. Thereby, a red color filter CFR, a blue color filter CFB, a green color filter CFG and a black matrix BM are formed. Further, a transparent resin material, which becomes an overcoat layer OC, is coated on the color filters CF, and the transparent resin material is patterned in a predetermined pattern, thus forming an overcoat layer OC. Then, a film of a transparent electrode material, such as ITO, is formed on the surface of the overcoat layer OC, and the film of transparent electrode material is patterned in a predetermined pattern, thus forming a common electrode CE. Thereafter, an alignment film AL2, which is subjected to rubbing treatment in a predetermined direction, is formed on the common electrode CE.

Columnar spacers (not shown) are formed, for example, by coating a resin material and patterning the resin material in a predetermined pattern, before coating the alignment film AL1, AL2 on the first transparent insulative substrate or second transparent insulative substrate.

Subsequently, a sealant SB, which is formed of, e.g. an ultraviolet-curing resin, is coated on the first transparent insulative substrate or second transparent insulative substrate in a manner to surround the active area ACT. The first transparent insulative substrate, which becomes plural array substrates AR, and the second transparent insulative substrate, which becomes plural counter-substrates CT, are opposed and aligned such that their alignment films AL1 and AL2 face each other. Then, the sealant SB is irradiated with ultraviolet and cured, thereby fixing the first transparent insulative substrate and second transparent insulative substrate. At this time, the first transparent insulative substrate and second transparent insulative substrate are aligned and fixed such that the main common electrodes CA are disposed on both sides of the main pixel electrode PA in the X-Y plane.

A liquid crystal material may be injected in the active area ACT from an injection port opening at the sealant SB, or a liquid crystal material may be dispensed in a region surrounded by the sealant SB before attaching the first transparent insulative substrate and second transparent insulative substrate. In the case of injecting the liquid crystal material from the injection port, the injection port is sealed by a sealing material after the injection and the liquid crystal layer LQ is formed. In the case of dispensing the liquid crystal material, the first transparent insulative substrate and second transparent insulative substrate are attached after the liquid crystal material has been dispensed, and the liquid crystal layer LQ is formed.

In the state in which the first transparent insulative substrate and second transparent insulative substrate are attached, the plural array substrates AR and plural counter-substrates CT are diced along the peripheries thereof, thereby cutting out liquid crystal display panels LPN.

Subsequently, polarizers OD1 and OD2 are provided on those surfaces of the array substrate AR and counter-substrate CT, which are opposite to the liquid crystal layer LQ side. Thus, a liquid crystal display device is fabricated.

As has been described above, in the present embodiment, since the pixel electrodes PE are formed in the same layer as the source lines S, the number of fabrication steps can be reduced, for example, compared to the case where pixel electrodes PE are formed of, e.g. ITO, in an upper layer of the source lines S.

In addition, since the drain electrode ED of the switching element SW and the pixel electrode PE can be integrally formed in the same layer, there is no need to provide a contact hole, and the aperture portion AP of the pixel can be made larger. Moreover, a disturbance of alignment of the liquid crystal can be avoided, and degradation in display quality can be suppressed.

Specifically, according to the present embodiment, there can be provided a liquid crystal display device and a method of manufacturing a liquid crystal display device, which can reduce the manufacturing cost and can suppress degradation in display quality.

Besides, the pixel electrode PE is disposed such that the pixel electrode PE is symmetric with respect to a position in the first direction X, at which the drain electrode ED of the switching element SW is disposed. In other words, the drain electrode ED is disposed at the center in the first direction X of the pixel electrode PE. If the pixel electrode PE is disposed symmetric with respect to the drain electrode ED, the potential distribution of the pixel electrode PE becomes symmetric in the first direction X, non-uniformity does not occur in transmittance, and degradation in display quality can be suppressed.

In the liquid crystal display device of the present embodiment, in the X-Y plane, the sub-common electrode CB is disposed between the pixel electrodes PE of pixels PX which are arranged in the second direction Y. Thus, electric fields, which are applied to liquid crystal layers LQ, can be prevented from affecting each other between pixels PX which neighbor each other in the second direction Y, and degradation in display quality can be suppressed. In addition, according to the present embodiment, a high transmittance can be obtained in the inter-electrode gap between the pixel electrode PE and the common electrode CE. Thus, a transmittance per pixel can sufficiently be increased by increasing the inter-electrode distance between the pixel electrode PE, on the one hand, and the main common electrodes CAL and CAR, on the other hand. As regards product specifications in which the pixel pitch is different, the peak condition of the transmittance distribution can be used by varying the inter-electrode distance. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, if attention is paid to the transmittance distribution in the region overlapping the black matrix BM, the transmittance is sufficiently lowered in this region. The reason for this is that the electric field does not leak to the outside of the pixel from the position of the common electrode CE, and an undesired lateral electric field does not occur between pixels which neighbor each other with the black matrix BM interposed, and therefore the liquid crystal molecules in the region overlapping the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the horizontal inter-electrode distance (the distance in the first direction) between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, the main common electrode CAL and main common electrode CAR are disposed immediately above the source line S1 and source line S2. Thus, compared to the case where the main common electrode CAL and main common electrode CAR are disposed on the pixel electrode PE side of the source line S1 and source line S2, the aperture portion AP can be enlarged and the transmittance of the pixel PX can be enhanced.

In addition, by disposing the main common electrode CAL and main common electrode CAR immediately above the source line S1 and source line S2, the inter-electrode distance between the pixel electrode PE, on the one hand, and the main common electrode CAL and main common electrode CAR, on the other hand, can be increased, and a lateral electric field, which is closer to a horizontal lateral electric field, can be produced. Therefore, a wide viewing angle, which is the advantage of an IPS mode, etc. in the conventional structure, can be maintained.

According to the present embodiment, a plurality of domains can be formed in one pixel. Thus, the viewing angle can optically be compensated in plural directions, and a wide viewing angle can be realized.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 2. An angle $\theta 1$ formed between the second direction Y and the initial alignment direction D is 0° or more and 45° or less. From the standpoint of alignment control of liquid crystal molecules LM, it is very effective that the angle $\theta 1$ is about 5° to 30°, more preferably 20° or less. Specifically, it is desirable that the initial alignment direction of liquid crystal molecules LM be substantially parallel to a direction in a range of 0° to 20°, relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is reversed, it is desirable that the above-described formed angle $\theta 1$ be within the range of 45° to 90°, preferably the range of 70° or more.

Since a lateral electric field is hardly produced over the pixel electrode PE or common electrode CE even at the ON time (or an electric field enough to drive liquid crystal molecules LM is not produced), the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the common electrode CE in this embodiment does not necessarily need to be formed of a transparent, electrically conductive material, and may be formed of an electrically conductive material such as aluminum, silver, or copper.

In the present embodiment, the structure of the pixel PX is not limited to the example shown in FIG. 2.

Figure 6:
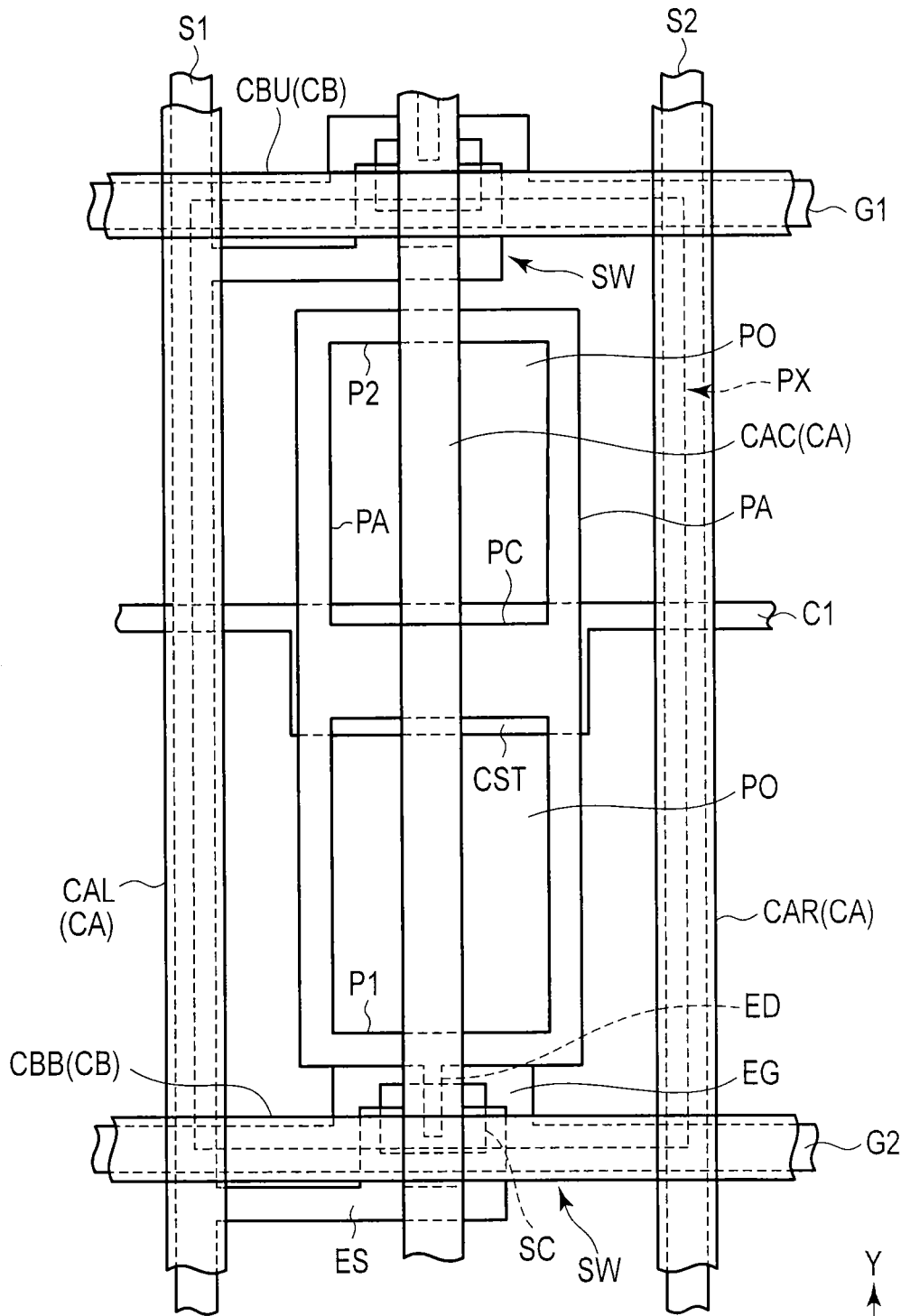
FIG. 6 is a plan view which schematically shows another structure example of the pixel at a time when the liquid crystal display panel shown in FIG. 1 is viewed from the counter-substrate side.

FIG. 6 is a plan view which schematically shows another structure example of the pixel PX at a time when the liquid crystal display panel LPN shown in FIG. 1 is viewed from the counter-substrate side.

In this example, the pixel electrode PE includes main pixel electrodes PA, a first connection portion P1, a second connection portion P2 and a capacitance portion PC.

The first connection portion P1 is disposed near the lower end portion of the pixel PX (near the switching element SW that is connected to the pixel electrode PE of the pixel PX), and is electrically connected to the drain electrode ED of the switching element SW (or formed integral with the drain electrode ED). The first connection portion P1 and the drain electrode ED are electrically connected to each other (formed integral with each other) at a substantially middle position in the first direction X of the pixel electrode PE.

The second connection portion P2 is disposed to extend in the first direction X in the vicinity of the upper end portion of the pixel PX. The capacitance portion PC is located at a region overlapping the projection portion CST of the storage capacitance line C1, and is opposed to the projection portion CST. The capacitance portion PC has a greater width than the main pixel electrode PA.

The main pixel electrodes PA linearly extend in the second direction Y from end portions in the first direction X of the capacitance portion PC toward the upper end portion and lower end portion. The main pixel electrodes PA are electrically connected to each other by the first connection portion P1 extending in the first direction X, in the vicinity of the lower side end portion of the pixel PX, and are also electrically connected to each other by the second connection portion P2 extending in the first direction X, in the vicinity of the upper side end portion of the pixel PX. The main pixel electrodes PA are surrounded by the main common electrodes CA and sub-common electrodes CB.

Specifically, on the lower side of the capacitance portion PC of the pixel electrode PE, there is provided a substantially rectangular aperture PO which is surrounded by the main pixel electrodes PA, first connection portion P1 and capacitance portion PC. In addition, on the upper side of the capacitance portion PC, there is provided a substantially rectangular aperture PO which is surrounded by the main pixel electrodes PA, second connection portion P2 and capacitance portion PC. The two apertures PO are arranged in the second direction Y, and are located at a substantially middle position between the source line S1 and source line S2, that is, at the center in the first direction X of the pixel PX.

The pixel PX of the example shown in FIG. 6 is the same as the pixel PX shown in FIG. 2, except for the structure of the pixel electrode PE. The second connection portion P2 is further provided for electrically connecting the extending end portions of the main pixel electrodes PA. Thereby, for example, even if one of the main pixel electrodes PA is missing on the upper side of the capacitance portion PC, a signal can be supplied via the second connection portion P2 from the other main pixel electrode PA. Therefore, according to this example, in addition to the advantageous effect of the above-described embodiment, it is possible to avoid a display defect such as a dot defect due to missing of the main pixel electrode PA.

In addition, when viewed in the X-Y plane of one pixel, the pixel electrode PE is disposed on the array substrate AR on the inside of the common electrode CE that is disposed on the counter-substrate. In other words, in one pixel PX, the pixel electrode PE is surrounded by the common electrode CE. In the case of FIG. 6, the second connection portion P2 is disposed within the pixel PX, as described above, and the sub-common electrode CBU is disposed at a boundary between the pixel PX and a neighboring pixel PX. Similarly, the first connection portion P1 is disposed within the pixel PX, and the sub-common electrode CBB is disposed at a boundary between the pixel PX and a neighboring pixel PX. Furthermore, the main pixel electrodes PA are disposed within the pixel PX, and the main common electrodes CAL and CAR are disposed at the boundaries of the pixel PX. By this arrangement, as shown in FIG. 5, electric force lines have their starting point and end point within one pixel, and the electric force lines in this pixel do not leak to a neighboring pixel.

Thus, for example, electric fields, which are applied to the liquid crystal layer LQ, do not affect each other between pixels PX which neighbor in the second direction Y.

Therefore, the liquid crystal molecules in the pixel do not move due to the effect of the electric field from the neighboring pixel, crosstalk can be suppressed, and degradation in display quality can be suppressed.

Figure 7:
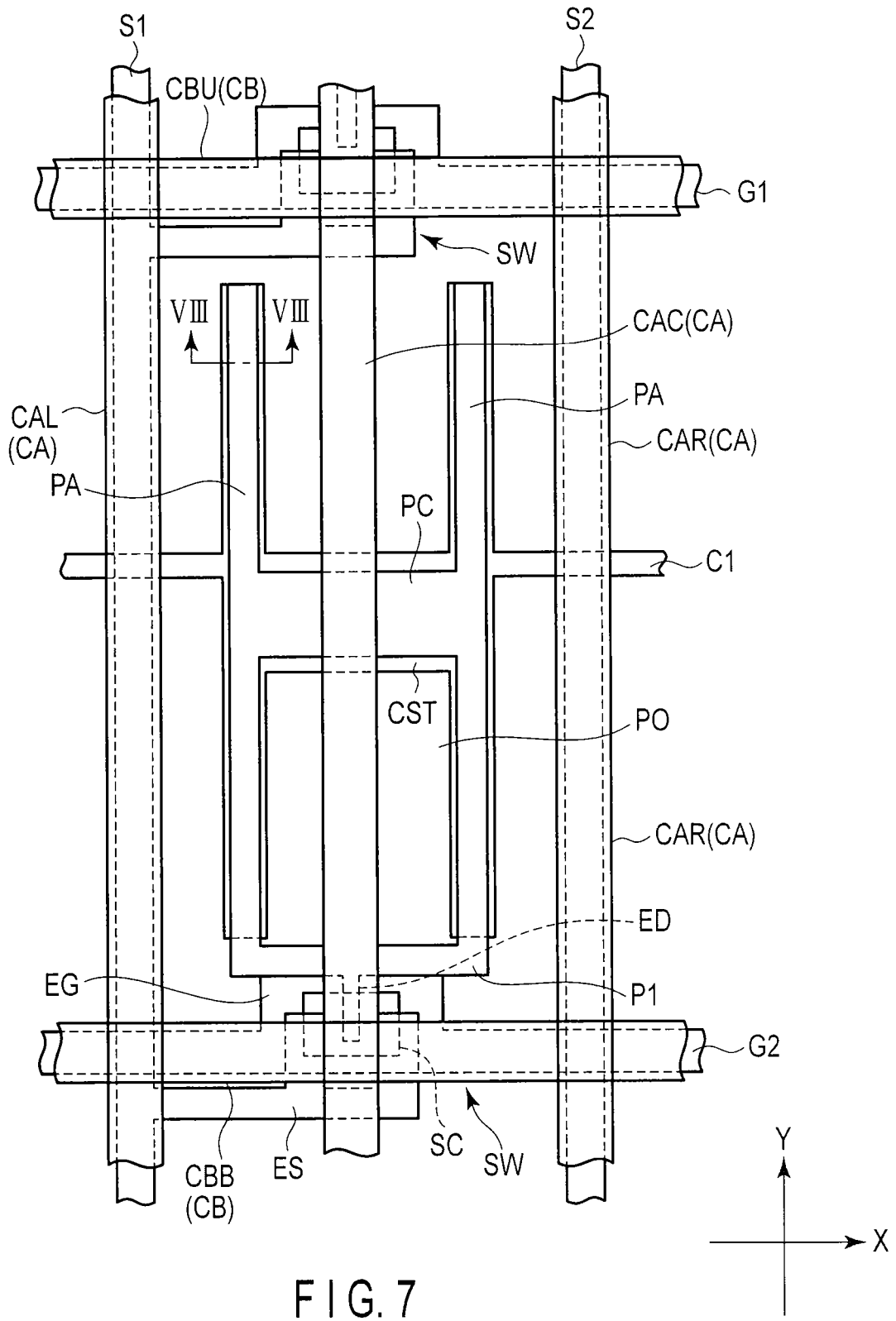
FIG. 7 is a plan view which schematically shows another structure example of the pixel at a time when the liquid crystal display panel shown in FIG. 1 is viewed from the counter-substrate side.

FIG. 7 is a plan view which schematically shows another structure example of the pixel PX at a time when the liquid crystal display panel LPN shown in FIG. 1 is viewed from the counter-substrate side.

In this example, the storage capacitance line C1 is disposed to also extend under the main pixel electrodes PA of the pixel electrode PE.

Figure 8:
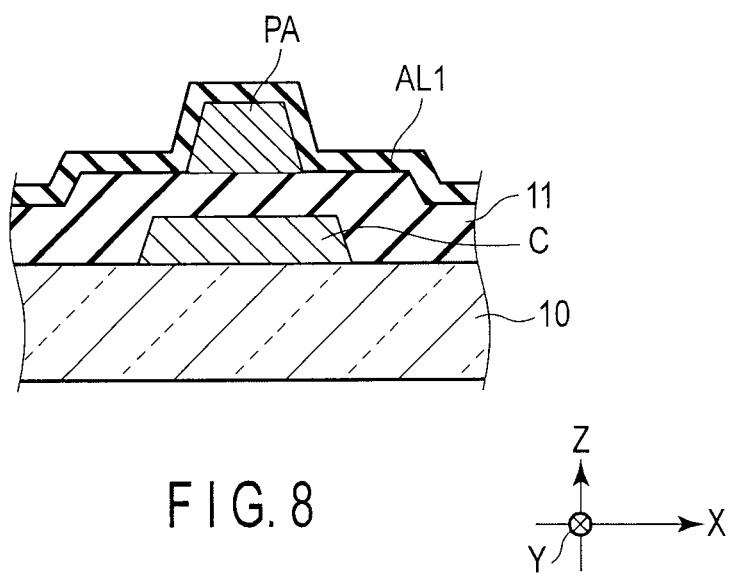
FIG. 8 is a schematic cross-sectional view, taken along line VIII-VIII in FIG. 7, showing a cross-sectional structure of the liquid crystal display panel shown in FIG. 7.

FIG. 8 is a schematic cross-sectional view, taken along line VIII-VIII in FIG. 7, showing a cross-sectional structure of the liquid crystal display panel LPN shown in FIG. 7.

The storage capacitance line C1 is disposed on the first insulative substrate 10, and the main pixel electrode PA is disposed to be opposed to the storage capacitance line C1 via the first interlayer insulation film 11. The main pixel electrode PA is covered with the first alignment film AL1.

Except for the above point, the pixel PX of the example shown in FIG. 7 and FIG. 8 is the same as the pixel PX shown in FIG. 2. If the storage capacitance line C1 is disposed to extend under the main pixel electrodes PA, as in this example, the storage capacitance CS can also be formed in parts at which the main pixel electrodes PA are opposed to the storage capacitance line C1. Thus, the area of the capacitance portion PC of the pixel electrode PE can be reduced by a degree corresponding to the capacitance which is formed between the main pixel electrodes PA and storage capacitance line C1. Therefore, a larger aperture portion AP can be formed and a greater aperture ratio can be realized.

According to this example, in addition to the advantageous effect of the above-described embodiment, the aperture portion AP can be made larger, and the display quality can be enhanced.

Figure 9:
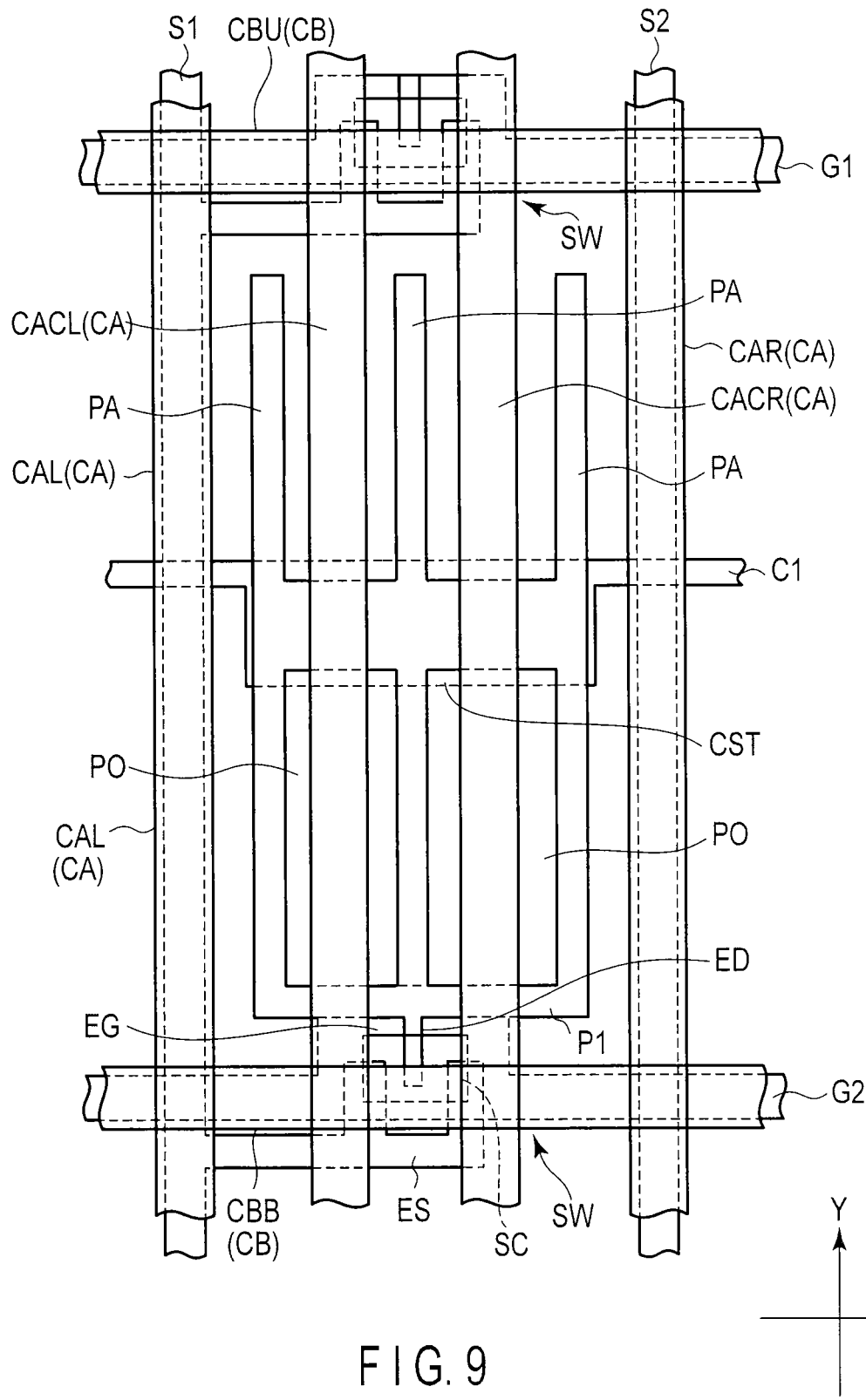
FIG. 9 is a plan view which schematically shows another structure example of the pixel at a time when the liquid crystal display panel shown in FIG. 1 is viewed from the counter-substrate side.

FIG. 9 is a plan view which schematically shows another structure example of the pixel PX at a time when the liquid crystal display panel LPN shown in FIG. 1 is viewed from the counter-substrate side.

In this example, a plurality of apertures PO, which are arranged in the first direction X, are provided in the pixel electrode PE of the pixel PX. In this example, the width of the pixel PX in the first direction X is about 70 μm, and the width of the pixel PX in the second direction Y is about 210 μm.

The pixel electrode PE includes main pixel electrodes PA, a connection portion P1 and a capacitance portion PC, which are electrically connected to each other.

The connection portion P1 is electrically connected to the drain electrode ED of the switching element SW (or formed integral with the drain electrode ED) at a substantially middle portion in the first direction X of the pixel electrode PE.

The main pixel electrodes PA linearly extend in the second direction Y from three locations of the capacitance portion PC to the vicinities of the upper side end portion and lower side end portion of the pixel PX. In the vicinity of the lower side end portion of the pixel PX, the main pixel electrodes PA are electrically connected to each other by the connection portion P1 which extends in the first direction X. Specifically, two apertures PO, which are surrounded by the main pixel electrodes PA, connection portion P1 and capacitance portion PC, are formed. The apertures PO are arranged in the first direction X between the source line S1 and source line S2.

The capacitance portion PC is disposed to overlap the projection portion CST of the storage capacitance line C1, thereby forming the storage capacitance CS between the capacitance portion PC and projection portion CST. The capacitance portion PC has a greater width than the main pixel electrode PA.

The common electrode CE includes main common electrodes CA and sub-common electrodes CB. The main common electrodes CA linearly extend, in the X-Y plane, in the second direction Y which is substantially parallel to the main pixel electrodes PA, on both sides of the main pixel electrodes PA. Alternatively, the main common electrode CA is opposed to the source line S or aperture PO, and extends substantially in parallel to the main pixel electrode PA. The main common electrode CA is formed in a strip shape having a substantially uniform width in the first direction X.

In the example illustrated, four main common electrodes CA are arranged in parallel in the first direction X, and are located at left and right end portions of the pixel PX and at central portions of the apertures PO. In the description below, in order to distinguish these main common electrodes CA, the main common electrode located on the left side in the Figure is referred to as "CAL", the main common electrode located on the right side in the Figure is referred to as "CAR", the main common electrode located on the left side of the center in the Figure is referred to as "CACL", and the main common electrode located on the right side of the center in the Figure is referred to as "CACR". The main common electrode CAL is opposed to the source line S1, the main common electrode CAR is opposed to the source line S2, the main common electrode CACL is opposed to the left-side aperture PO, and the main common electrode CACR is opposed to the right-side aperture PO. The main common electrode CAL, main common electrode CAR, main common electrode CACL and main common electrode CACR are electrically connected to each other within the active area or outside the active area.

In the pixel PX, the main common electrode CAL is disposed at the left side end portion, and the main common electrode CAR is disposed at the right side end portion. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side. The main common electrodes CACL and CACR are disposed at substantially middle portions of the apertures PO of the pixel PX in the first direction X.

The sub-common electrodes CB extend, in the X-Y plane, linearly in the first direction X between apertures PO of pixel electrodes PE which are arranged in the second direction Y. The sub-common electrodes CB extend substantially perpendicular to the main pixel electrodes PA. The sub-common electrode CB is formed in a strip shape having a substantially uniform width in the second direction Y.

In the example illustrated, the sub-common electrodes CB are disposed between pixel electrodes PE which are arranged in the second direction Y, and are disposed on the upper end portion and lower end portion of the pixel PX. In the description below, in order to distinguish these sub-common electrodes CB, the sub-common electrode located on the upper side in the Figure is referred to as "CBU", and the sub-common electrode located on the lower side is referred to as "CBB". The sub-common electrode CBU is opposed to the gate line G1, and the sub-common electrode CBB is opposed to the gate line G2. The sub-common electrode CBU and sub-common electrode CBB are electrically connected to each other within the active area or outside the active area.

In the pixel PX, the sub-common electrode CBU is disposed at the upper side end portion, and the sub-common electrode CBB is disposed at the lower side end portion. Strictly speaking, the sub-common electrode CBU is disposed to extend over a boundary between the pixel PX and a pixel neighboring on the upper side, and the sub-common electrode CBB is disposed to extend over a boundary between the pixel PX and a pixel neighboring on the lower side.

Paying attention to the positional relationship between the pixel electrode PE and the main common electrodes CA, the main pixel electrodes PA and main common electrodes CA are alternately arranged along the first direction X. The main pixel electrodes PA and main common electrodes CA are arranged substantially parallel to each other. In this case, in the X-Y plane, the main common electrode CAL, main common electrode CAR, main common electrode CACL and main common electrode CACR do not overlap the main pixel electrode PA. The main pixel electrodes PA are surrounded by the main common electrodes CA and sub-common electrodes CB.

Specifically, one main pixel electrode PA is located between the main common electrode CAL and main common electrode CACL which neighbor each other, between the main common electrode CACL and main common electrode CACR, and between the main common electrode CAR and main common electrode CACR. In other words, the main common electrode CAL, main common electrode CAR, main common electrode CACL and main common electrode CACR are located on both sides of positions immediately above the main pixel electrodes PA. Alternatively, the main pixel electrodes PA are located between the main common electrode CAL and main common electrode CACL, between the main common electrode CACL and main common electrode CACR, and between the main common electrode CACR and main common electrode CAR. Thus, the main common electrode CAL, main pixel electrode PA, main common electrode CACL, main pixel electrode PA, main common electrode CACR, main pixel electrode PA and main common electrode CAR are arranged in the named order along the first direction X.

The intervals in the first direction X between the pixel electrodes PE and common electrodes CE are substantially equal. Specifically, the distance in the first direction X between the main common electrode CAL and main pixel electrode PA, the distance in the first direction X between the main common electrode CACL and main pixel electrode PA, and the distance in the first direction X between the main common electrode CACR and main pixel electrode PA, are substantially equal.

Except for the above point, the pixel PX of the example shown in FIG. 9 is the same as the pixel PX shown in FIG. 2. As has been described above, even when the number of main pixel electrodes PA, which are disposed in each pixel, is increased, the same advantageous effects as in the above-described embodiment can be obtained.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
    a first substrate including a first insulative substrate, a first wiring line extending in a first direction on a side of the first insulative substrate, a second wiring line disposed spaced apart from the first wiring line, an interlayer insulation film covering the first wiring line and the second wiring line, third wiring lines extending in a second direction crossing the first direction on the interlayer insulation film, and a first electrode including, on the interlayer insulation film, a capacitance portion opposed to the second wiring line, and main pixel electrodes extending from the capacitance portion in the second direction, the first electrode being spaced apart from the third wiring lines;
    a second substrate including a second insulative substrate, and second electrodes extending, on a side of the second insulative substrate which is opposed to the first substrate, in a direction which is substantially parallel to a direction of extension of the first electrode, on both sides of the first electrode; and
    a liquid crystal layer including liquid crystal molecules held between the first substrate and the second substrate.

2. The liquid crystal display device of claim 1, wherein the first substrate further includes a thin-film transistor configured to switch a electrical connection between the third wiring line and the first electrode, and
    the first electrode further includes a connection portion which is formed integral with a drain electrode of the thin-film transistor and is electrically connected to the main pixel electrodes.

3. The liquid crystal display device of claim 1, wherein the main pixel electrodes are disposed to extend in the second direction from both end portions in the first direction of the capacitance portion, and
    the first electrode further includes a connection portion configured to electrically connect extending end portions of the main pixel electrodes.

4. The liquid crystal display device of claim 1, wherein the main pixel electrodes are disposed to extend in the second direction from both end portions in the first direction of the capacitance portion, and
    the first electrode further includes an aperture formed by the main pixel electrodes, the capacitance portion and a connection portion extending between the main pixel electrodes.

5. The liquid crystal display device of claim 4, wherein the first electrode further includes a second connection portion extending between the main pixel electrodes, and a second aperture formed by the main pixel electrodes, the capacitance portion and the second connection portion.

6. The liquid crystal display device of claim 4, wherein a plurality of said apertures are arranged in the first direction.

7. The liquid crystal display device of claim 1, wherein the second wiring line is disposed to extend in a layer below the main pixel electrodes.

8. The liquid crystal display device of claim 5, wherein the second wiring line is disposed to extend in a layer below the main pixel electrodes.

9. The liquid crystal display device of claim 1, wherein the second electrodes are disposed at positions opposed to the third wiring lines.

10. The liquid crystal display device of claim 5, wherein the second electrodes are disposed at positions opposed to the third wiring lines.

11. The liquid crystal display device of claim 7, wherein the second electrodes are disposed at positions opposed to the third wiring lines.

12. The liquid crystal display device of claim 1, wherein the second substrate further includes a second sub-electrode which is electrically connected to the second electrodes and extends in the first direction between the first electrodes which are arranged in the second direction.

13. The liquid crystal display device of claim 5, wherein the second substrate further includes a second sub-electrode which is electrically connected to the second electrodes and extends in the first direction between the first electrodes which are arranged in the second direction.

14. The liquid crystal display device of claim 7, wherein the second substrate further includes a second sub-electrode which is electrically connected to the second electrodes and extends in the first direction between the first electrodes which are arranged in the second direction.

15. The liquid crystal display device of claim 12, wherein the second sub-electrode is disposed to be opposed to the first wiring line.

16. The liquid crystal display device of claim 13, wherein the second sub-electrode is disposed to be opposed to the first wiring line.

17. The liquid crystal display device of claim 14, wherein the second sub-electrode is disposed to be opposed to the first wiring line.

18. A method of manufacturing a liquid crystal display device, comprising:
    forming and patterning an electrically conductive layer on a first insulative substrate, thereby forming a first wiring line extending in a first direction and a second wiring line disposed spaced apart from the first wiring line;
    forming an interlayer insulation film covering the first wiring line and the second wiring line;
    forming and patterning an electrically conductive layer on the interlayer insulation film, thereby forming third wiring lines extending in a second direction crossing the first direction, and a first electrode which is spaced apart from the third wiring lines and includes, via the interlayer insulation film, a capacitance portion opposed to the second wiring line, and main pixel electrodes extending from the capacitance portion in the second direction, whereby a first substrate is formed;
    forming second electrodes extending in the second direction on a second insulative substrate, whereby a second substrate is formed;
    disposing the first substrate and the second substrate to be opposed to each other and fixing the first substrate and the second substrate, such that the second electrodes are disposed on both sides of the first electrode; and
    injecting a liquid crystal material including liquid crystal molecules between the first substrate and the second substrate.

* * * * *